(12) United States Patent
Kim et al.

(10) Patent No.: US 9,369,561 B2
(45) Date of Patent: Jun. 14, 2016

(54) MOBILE TERMINAL AND METHOD FOR CONTROLLING THE SAME

(71) Applicant: LG ELECTRONICS INC., Seoul (KR)

(72) Inventors: Taeseong Kim, Seoul (KR); Yujune Jang, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/657,720

(22) Filed: Mar. 13, 2015

(65) Prior Publication Data
US 2016/0044153 A1 Feb. 11, 2016

(30) Foreign Application Priority Data

Aug. 5, 2014 (KR) .................. 10-2014-0100477

(51) Int. Cl.
*H04W 68/00* (2009.01)
*H04M 1/725* (2006.01)
*G06F 3/0482* (2013.01)
*G06F 3/0488* (2013.01)

(52) U.S. Cl.
CPC ......... *H04M 1/72522* (2013.01); *G06F 3/0482* (2013.01); *G06F 3/04883* (2013.01); *G06F 3/04886* (2013.01); *H04W 68/00* (2013.01)

(58) Field of Classification Search
CPC .................... H04M 1/72522; H04W 68/00
USPC .......................................... 455/418
See application file for complete search history.

(56) References Cited

U.S. PATENT DOCUMENTS

| | | | | |
|---|---|---|---|---|
| 2009/0307631 | A1* | 12/2009 | Kim et al. | 715/830 |
| 2010/0013780 | A1* | 1/2010 | Ikeda et al. | 345/173 |
| 2010/0199180 | A1 | 8/2010 | Brichter | |
| 2013/0055170 | A1 | 2/2013 | Langlois et al. | |
| 2013/0172022 | A1* | 7/2013 | Seymour et al. | 455/458 |
| 2013/0191911 | A1* | 7/2013 | Dellinger et al. | 726/19 |

FOREIGN PATENT DOCUMENTS

| | | | |
|---|---|---|---|
| EP | 1 860 536 A2 | 11/2007 | |
| EP | 2 474 894 A1 | 7/2012 | |
| EP | 2 608 006 A2 | 6/2013 | |

* cited by examiner

*Primary Examiner* — Michael Neff
(74) *Attorney, Agent, or Firm* — Birch, Stewart, Kolasch & Birch, LLP

(57) ABSTRACT

A mobile terminal including a wireless communication unit configured to provide wireless communication; a touchscreen; and a controller configured to receive a diagonal sliding input from one side of the touchscreen, display a notification panel on the touchscreen including at least first and second regions, wherein the first region includes at least a first application icon corresponding to a first unconfirmed notification, in response to the diagonal sliding input, receive a horizontal drag input following the diagonal sliding input, and display details of the first unconfirmed notification in the second region in response to the horizontal drag input.

20 Claims, 20 Drawing Sheets

(a)

(b)

(a)

(b)

(a)

(b)

(a)

(b)

(c)

MOBILE TERMINAL AND METHOD FOR CONTROLLING THE SAME

CROSS-REFERENCE TO RELATED APPLICATIONS

This application claims priority to Korean Patent Application No. 10-2014-0100477 filed on 5 Aug., 2014 in Korea, the entire content of which is hereby incorporated by reference in its entirety.

BACKGROUND OF THE INVENTION

1. Field of the Invention

The present invention relates to a mobile terminal which displays an unconfirmed notification on a notification panel and a method for controlling the same.

2. Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In general, a user can view a terminal system setting state or a new notification message by sliding a notification panel. However, as the amount of information displayed on the notification panel increases and a plurality of notification messages regarding various applications is received, the user has to repeat continuous scrolling operations in order to check notification messages.

SUMMARY OF THE INVENTION

Accordingly, an object of the present invention is to address the above-noted and other problems.

Another object of the present invention is to provide a mobile terminal and a method for controlling the same, which display a notification panel including at least one of a first region in which an icon of at least one application related to a received unconfirmed notification is displayed and a second region in which the unconfirmed notification is displayed, along a sliding trajectory of diagonal sliding input from one side of a touchscreen, when the diagonal sliding input is received In addition, upon reception of left or right drag input following the sliding input, display an unconfirmed notification related to a specific application corresponding to the drag input in the second region.

According to one aspect of the present invention to accomplish the aforementioned or other objects, there is provided a mobile terminal including a touchscreen; and a controller configured to cause the touchscreen to display a notification panel including at least one of a first region and a second region, wherein the first region is displayed an icon of at least one application related to a received unconfirmed notification and the second region is displayed the unconfirmed notification, upon reception of diagonal sliding input from one side of the touchscreen, along a sliding trajectory of the diagonal sliding input; and upon reception of a left or right drag input following the sliding input, cause the touchscreen to display an unconfirmed notification related to a specific application in the second region, wherein the specific application is selected corresponding to the drag input. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
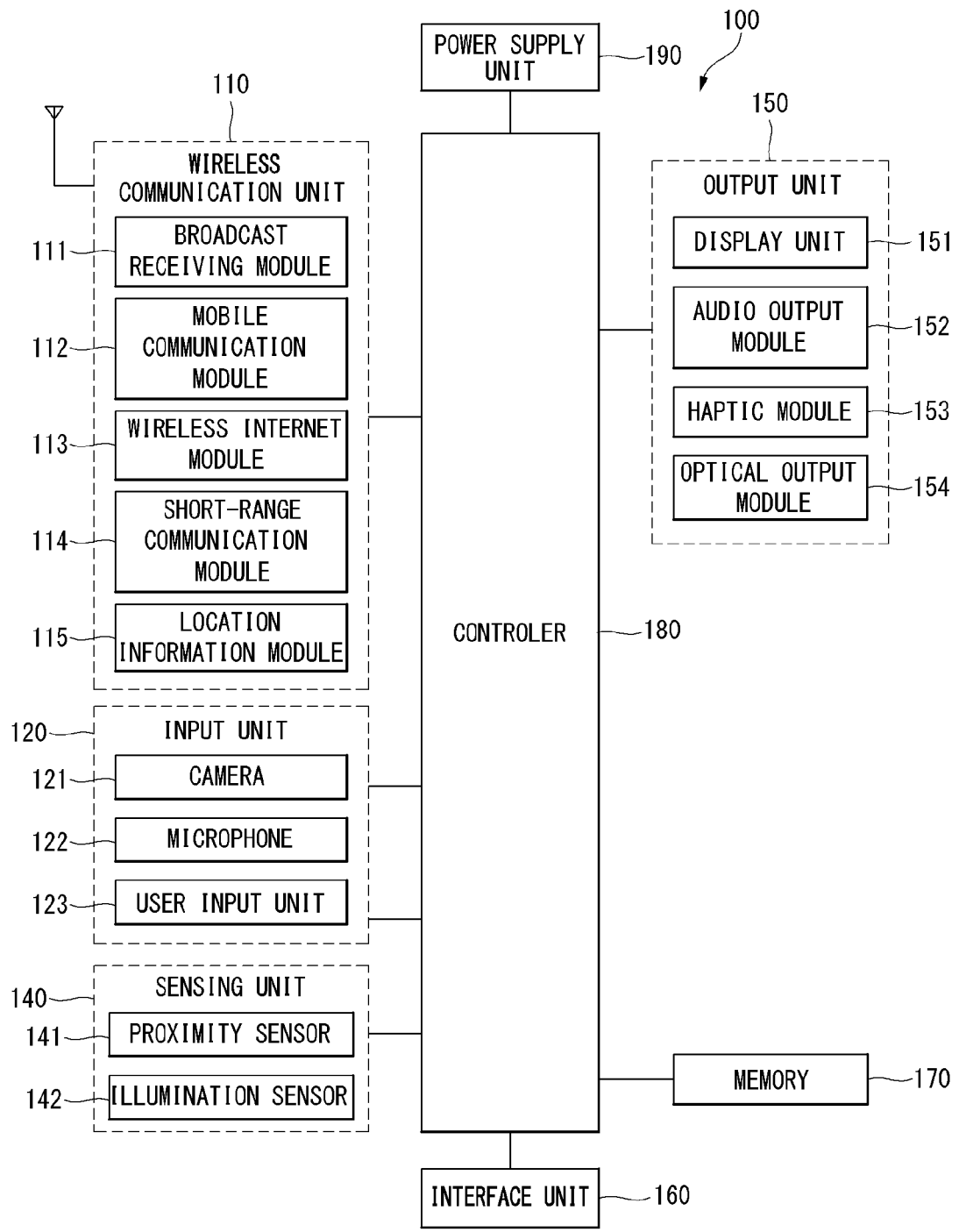
FIG. 1A is a block diagram of a mobile terminal according to an embodiment of the present invention.
Figure 1B:
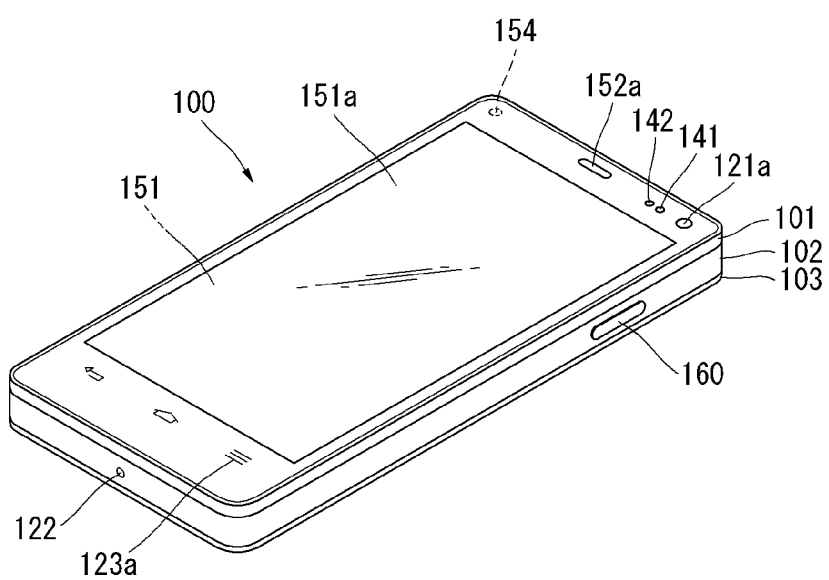
FIGS. 1B and 1C are conceptual views of one example of the mobile terminal, viewed from different directions.
Figure 1C:
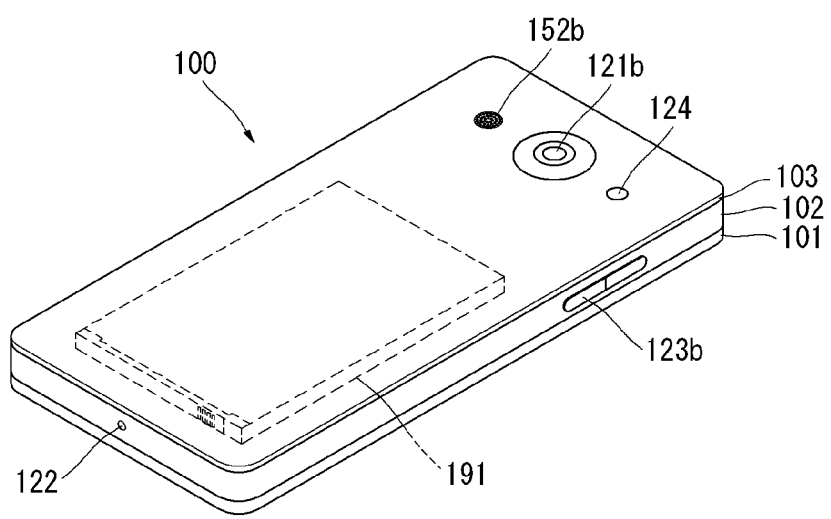

Reference is now made to FIGS. 1A-1C, where FIG. 1A is a block diagram of a mobile terminal according to an embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180, within the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant invention. Some components may be omitted or rearranged. For example, the first manipulation unit 123a may be located on another surface of the terminal body, and the second audio output module 152b may be located on the side surface of the terminal body. The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
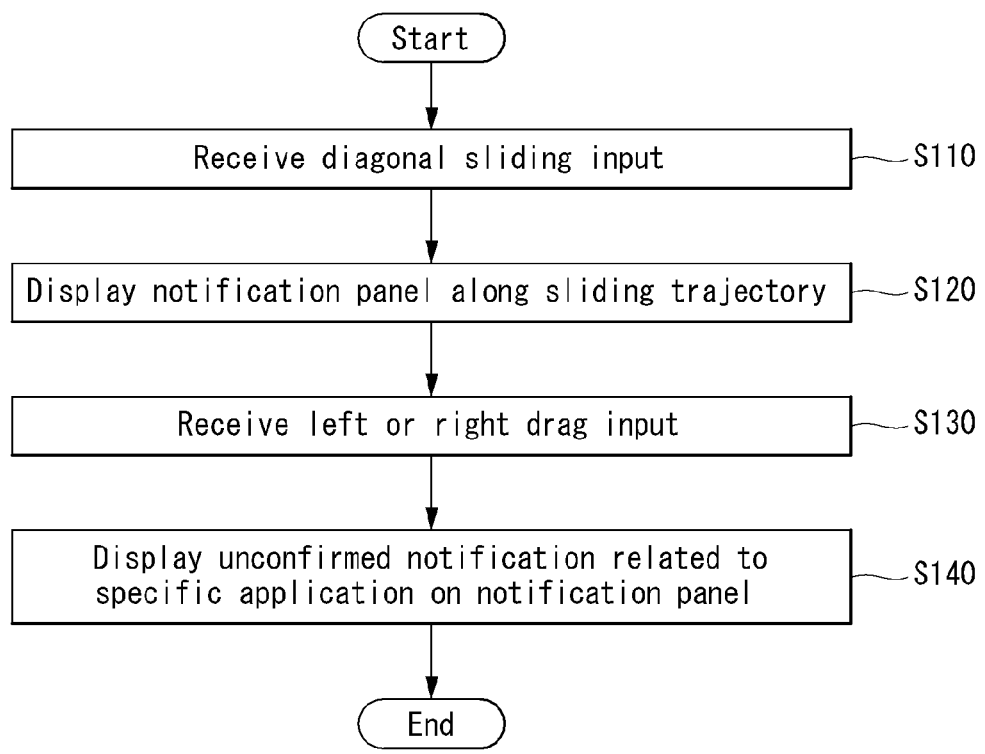
FIG. 2 is a flowchart illustrating a method for controlling the mobile terminal according to an embodiment of the present invention.

FIG. 2 is a flowchart illustrating a method for controlling the mobile terminal according to one embodiment of the present invention, and FIGS. 3 to 18 are views illustrating the method for controlling the mobile terminal according to embodiments of the present invention.

Referring to FIG. 2, the controller 180 can receive a sliding input in a diagonal direction from one side of the touchscreen (S110). Here, one side of the touchscreen refers to a specific region of the upper or lower part of the touchscreen and the specific region may include a bezel region. The specific region may be set to a region having a specific width along the upper edge of the touchscreen in the display direction of the touchscreen.

The controller 180 can set the sliding input in a diagonal direction in various manners. Specifically, the controller 180 can set an input, which slides at a predetermined angle or more from a corner region of the touchscreen, as a diagonal sliding input. Here, the corner region of the touchscreen refers to a region within a specific radius from a corner of the touchscreen and may include a bezel region surrounding the touchscreen. In addition, the controller 180 can set an input, which slides at a predetermined angle or more irrespective of a starting point, as a diagonal sliding input. Furthermore, the controller 180 can divide diagonal sliding inputs into a sliding input in a first diagonal direction toward the left of the starting point of sliding input and a sliding input in a second diagonal direction toward the right of the starting point of sliding input and assign different functions to the two sliding inputs.

The controller 180 can display a notification panel including at least one of a first region, which displays an icon indicating at least one application related to a received unconfirmed notification along a sliding trajectory, and a second region, which displays an unchecked notification.

According to an embodiment of the present invention, the controller 180 can display a notification panel in a configuration different from a related art notification panel upon reception of diagonal sliding input. According to an embodiment of the present invention, the notification panel may further include the first region, which is discriminated from the second region and displays an icon indicating at least one application related to a received unconfirmed notification. The notification panel may further include a third region. The third region displays the whole unconfirmed notification or part thereof in a sliding manner. Furthermore, the notification panel may further include a region which displays a system setting item of the terminal and a specific application icon.

The controller 180 can determine the order of displaying one or more application icons in consideration of at least one of an unconfirmed notification reception order, the frequency of execution of at least one application and the number of received unconfirmed notifications.

The controller 180 can display a notification panel having display characteristics discriminated from those of a normal notification panel, upon reception of a diagonal sliding input. For example, the controller 180 can display a notification panel in a color different from the normal notification panel upon reception of a diagonal sliding input.

The controller 180 can set a configuration included in each region of the notification panel according to sliding input in the first diagonal direction and sliding input in the second diagonal direction. Specifically, the controller 180 can set the notification panel such that the notification panel further displays at least one of the system setting item of the terminal and a shortcut icon of an application according to sliding inputs in different diagonal directions and change the order of displaying the system setting item of the terminal and the application shortcut icon.

When the notification panel is displayed on the overall area of the touchscreen 151 and pinch-in or pinch-out input is received through the notification panel, the controller 180 can hide the second region of the notification panel or bring the hidden second region back to the notification panel.

The controller 180 can slide the first region in the horizontal direction of the notification panel along a sliding trajectory so as to display the first region. Specifically, the controller 180 can display the first region distinguished from the notification panel on the touchscreen and dynamically display the first region such that the first region moves in the horizontal direction along the sliding trajectory to constitute the notification panel. A description will be given of the regions of the notification panel.

The controller 180 can receive a left or right drag input, which is related to the first region of the notification panel, following the sliding input through the notification panel (S130) and change the display of the second region of the notification panel to an unconfirmed notification of a specific application corresponding to the drag input (S140).

Upon selection of a specific application according to the left or right drag input related to the first region, the controller 180 can display an icon of the specific application such that the icon is discriminated from icons of other applications. Specifically, the controller 180 can magnify and display the icon of the specific application or display the icon such that the brightness of the icon is distinguished from other icons.

When the drag input is held at a specific point or upward or downward flicking input following the drag input is applied to the specific point, the controller 180 can immediately execute a specific application corresponding to the specific point. That is, the controller 180 can execute shortcut to the execution screen of the specific application through hold input or flicking input following the drag input. Here, the execution screen of the specific application may be an execution screen on which an unconfirmed notification displayed in the second region of the notification panel is displayed. The controller 180 can display the execution screen of the specific application when the hold input is maintained for a predetermined time or when the flicking input is released.

The controller 180 can cancel display of the notification panel upon release of the sliding input or the drag input when the notification panel is displayed in less than a predetermined length. On the contrary, the controller 180 can display the notification panel on the overall area of the touchscreen upon release of the sliding input or the drag input when the notification panel is displayed in greater than the predetermined length.

The controller 180 can display a specific panel, which displays a plurality of filtered application icons, on the touchscreen 151 such that the specific panel is distinguished from the notification panel, upon reception of diagonal sliding input. Specifically, when the notification panel slides from one side of the touchscreen to be displayed on the touchscreen, the controller 180 can display the specific panel on an area of the touchscreen, in which the notification panel is not displayed. The controller 180 can display the specific panel until the notification panel is displayed in the overall area of the touchscreen and cancel display of the specific panel upon display of the notification panel in the overall area of the touchscreen.

Upon reception of touch input applied to an icon of a specific application, which is displayed on the specific panel, while the sliding input is maintained, the controller 180 can transmit an unconfirmed notification displayed on the notification panel to the specific application to which the touch input is applied. That is, the controller 180 can display the notification panel in an area of the touchscreen along a sliding trajectory and, simultaneously, transmit the unconfirmed notification displayed on the notification panel to the specific application to which the touch input is applied upon reception of the touch input applied to the specific application icon displayed on the specific panel.

The controller 180 can select the specific application to be displayed on the specific panel based on the frequency of execution of the application or according to user setting. The controller 180 can display an unconfirmed notification of the specific application in the second region in the form of a list or display the execution screen of the specific application including the unconfirmed notification in the second region in the form of a preview image. Here, the preview image refers to one of execution screens of the specific application including the unconfirmed notification.

Upon reception of diagonal sliding input when the light source of the touchscreen 151 is turned off, the controller 180 can light up at least part of the touchscreen 151 along a sliding trajectory so as to display the notification panel.

Specifically, when the terminal is not locked, the controller 180 can light up an area of the touchscreen, in which the notification panel is displayed along the sliding trajectory, to display the notification panel and maintain other areas in a light-off state.

In addition, the controller 180 can display only an icon of an application which is not locked from among one or more applications with respect to unconfirmed notifications and an unconfirmed notification related to the application, on the notification panel. That is, the controller 180 can display only a notification related to an unlocked application on the notification panel.

Furthermore, when the terminal is locked, the controller 180 can light up the first region along a sliding trajectory so as to display an icon of at least one application related to a received unconfirmed notification, upon reception of diagonal sliding input when the light of the touchscreen is turned off. Upon input of a security pattern through a touchscreen area in which lights sources are turned off while the sliding input is maintained, the controller 180 can light up the second region to display the notification panel. Here, the security pattern may include continuous touch patterns or discontinuous codes.

Upon release of the drag input, the controller 180 can cancel display of the notification panel and turn off the light of the touchscreen. That is, a notification can be confirmed through one interaction while the light of the touchscreen is turned off and the off state of the light can be maintained by cancelling the interaction.

Figure 3:
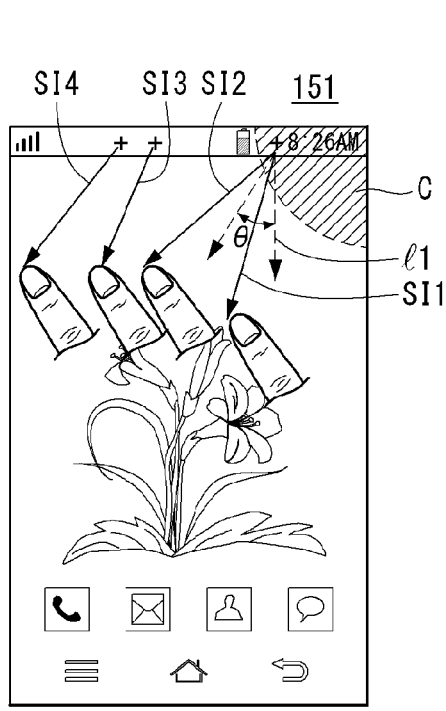
FIGS. 3 to 18 are views illustrating embodiments of the method for controlling the mobile terminal according to the present invention.
Figure 3:
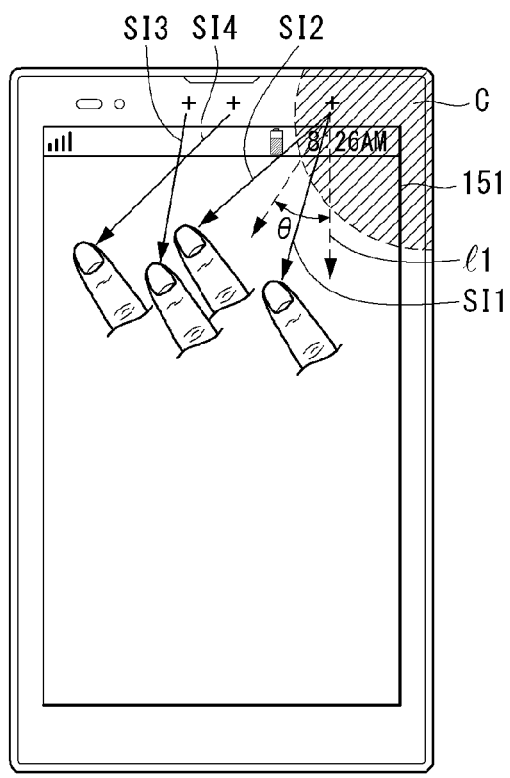

Embodiments of the method for controlling the mobile terminal according to an embodiment of the present invention will now be described with reference to FIGS. 3 to 18. FIG. 3 illustrates a method of setting and recognizing diagonal sliding input in the mobile terminal according to an embodiment of the present invention.

Referring to FIG. 3, the controller 180 can receive a diagonal sliding input from one side of the touchscreen 151. The controller 180 can divide a sliding input for displaying the notification panel into a first input for displaying a related art notification panel having a normal configuration and a second input for displaying the notification panel according to an embodiment of the present invention. The second input is referred to as diagonal sliding input hereinafter.

The controller 180 can set an input, which starts from a corner C of the touchscreen 151 and slides at a predetermined angle θ or more, as a diagonal sliding input. In this instance, the controller 180 can recognize a sliding input SI2, which slides at the predetermined angle θ or more, from among sliding inputs SI1 and SI2 starting from the corner C as a diagonal sliding input and not recognize the sliding input SI1, which slides at less than the predetermined angle θ, as a diagonal sliding input. That is, the controller 180 can determine an input, which slides at the predetermined angle θ or more based on the vertical direction 11 of the starting point of the sliding input, as a diagonal sliding input.

In addition, the controller 180 can set an input, which starts from an upper region of the touchscreen and slides at the predetermined angle θ or more, as a diagonal sliding input. In this instance, the controller 180 can recognize sliding inputs SI2 and SI4, which slide at the predetermined angle θ or more, from among sliding inputs SI1 to SI4 starting from the upper region of the touchscreen 151 as diagonal sliding inputs and not recognize the sliding inputs SI1 and SI3, which slide at less than the predetermined angle θ, as a diagonal sliding input.

The controller 180 can extend the upper region or the corner C of the touchscreen to a bezel region and recognize an input, which starts from the bezel region and slides at the predetermined angle θ or more, as a diagonal sliding input. As described above, the controller 180 can limit the starting point of a diagonal sliding input to the corner C of the touchscreen.

Figure 4:
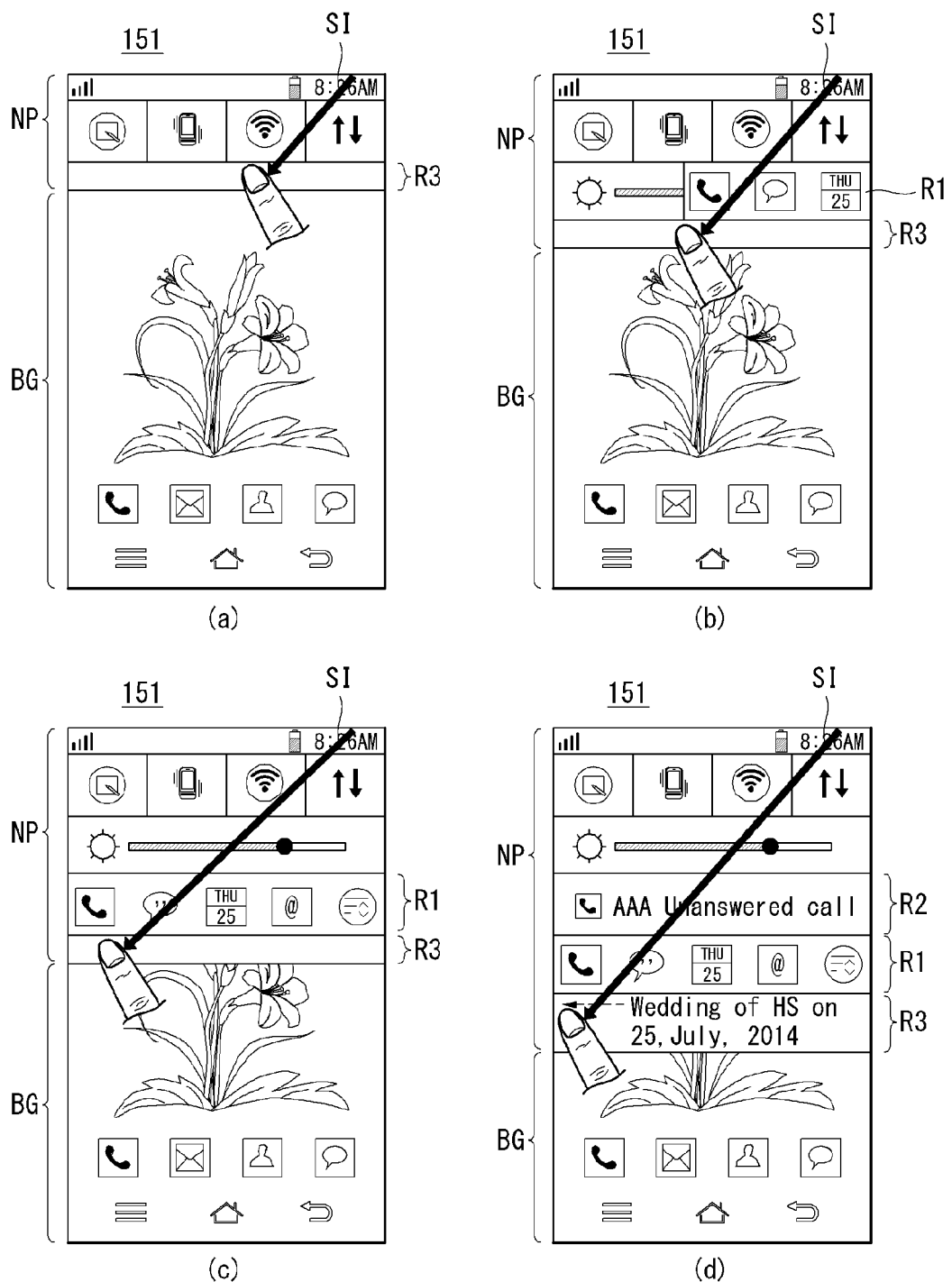
Figure 5:
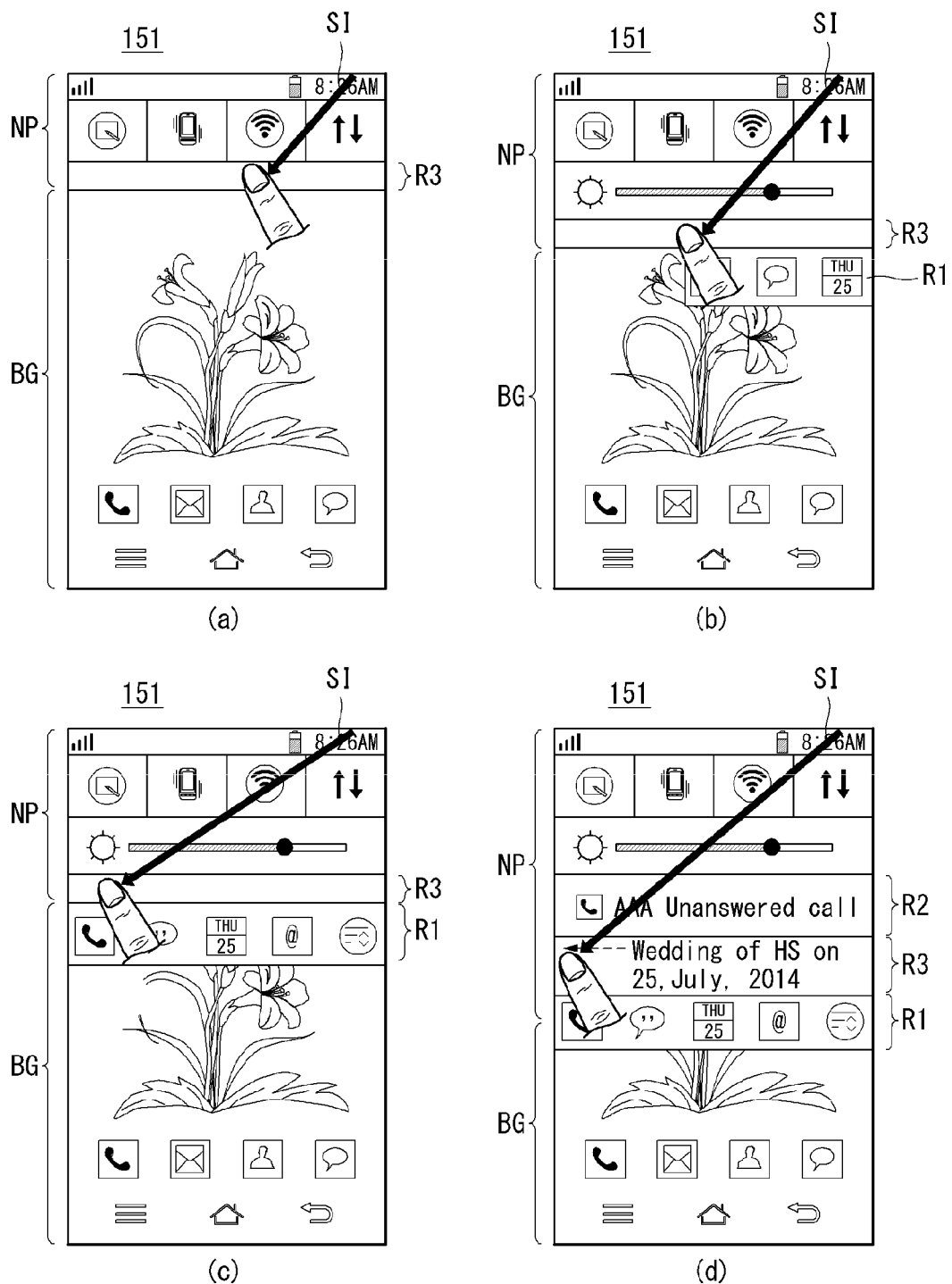
Figure 6:
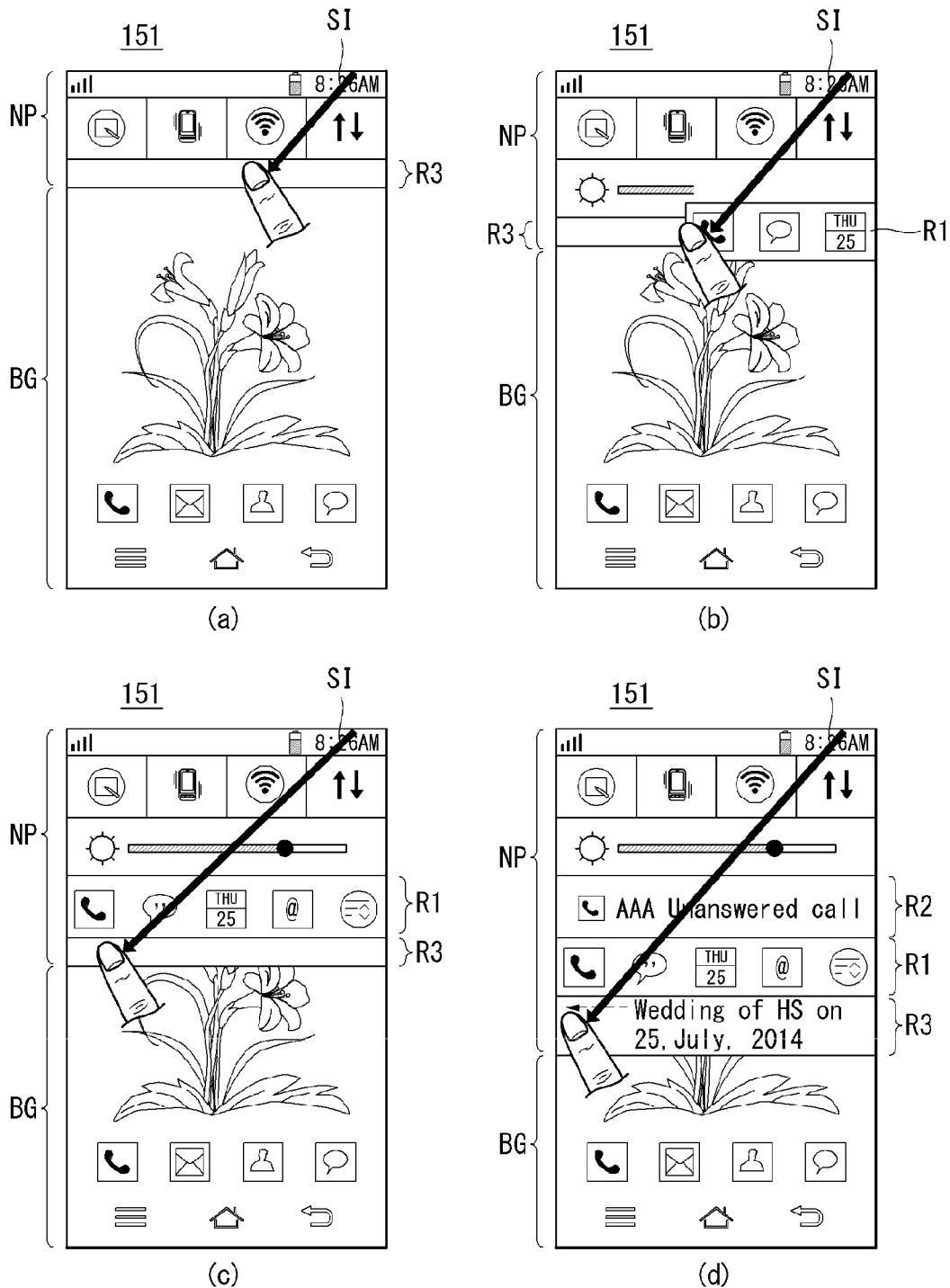

FIGS. 4 to 6 illustrate a method of displaying the notification panel in the mobile terminal according to an embodiment of the present invention. Referring to FIGS. 4 to 6, the controller 180 can gradually display the notification panel NP on the touchscreen 151 along the trajectory of a sliding input SI. The controller 180 can display the notification panel NP so the notification panel NP is superposed on a background picture BG of the touchscreen 151.

The controller 180 can display the third region R3 corresponding to the lowest region of the notification panel NP such that the third region R3 is distinguished from other regions of the notification panel NP. The controller 180 can display an unconfirmed notification or part thereof in the third region R3.

Upon reception of the sliding input SI, the controller 180 can control the first region R1 to slide in the horizontal direction to be displayed on the notification panel NP. The controller 180 can fix the first region R1 to the notification panel NP upon application of the sliding input SI in a first length or more. The controller 180 can further display the second region R2 on the notification panel NP upon application of the sliding input SI in a second length or more.

The controller 180 can set positions of the regions R1, R2 and R3 of the notification panel NP in various manners and change the position at which the first region R1 is gradually displayed in the horizontal direction to a region on the third region R3, a region under the third region R3 or a region overlapped with the third region R3 based on the positions of the first, second and third regions.

The controller 180 can display an icon indicating at least one application with respect to a received unconfirmed notification in the first region R1. Specifically, when unconfirmed notifications with respect to a call application, a message application, a schedule application, an Internet application and an editing application are present, the controller 180 can display icons of the applications in the first region R1.

The controller 180 can display an unconfirmed notification in the second region R2. Here, the unconfirmed notification displayed in the second region R2 may be an unconfirmed notification with respect to a specific application corresponding to a position of a user's finger. The controller 180 can display the unconfirmed notification displayed in the second region R2 in the form of a list or display the execution screen of the specific application as a preview image.

The controller 180 can set the notification panel NP such that the notification panel NP further includes a region, which displays the system setting item of the terminal, in addition to the first, second and third regions R1, R2 and R3.

Figure 7:
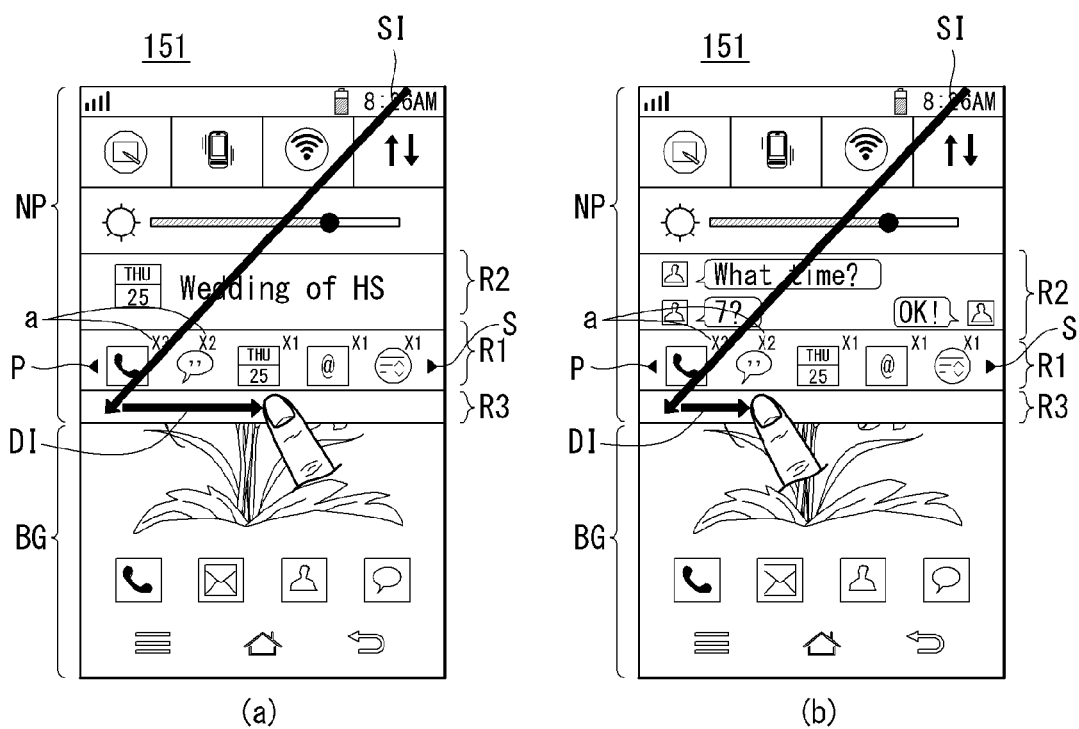

Next, FIGS. 7 to 10 illustrate a method of confirming a notification related to a specific application, which is displayed on the notification panel, in the mobile terminal according to an embodiment of the present invention. Referring to FIG. 7, the controller 180 can receive left or right drag input DI following the sliding input, through the notification panel NP.

The notification panel NP may include the first region R1, which displays an icon of at least one application related to a received unconfirmed notification, the second region R2 which displays the unconfirmed notification and the third region R3 to which the drag input is applied. The controller 180 can display application icons in the first region R1 based on the number of unconfirmed notifications and display an indicator (a), which indicates the number of unconfirmed notifications related to each application, at one side of each application icon.

Specifically, upon reception of the left or right drag input DI applied to the third region R3 of the notification panel NP, the controller 180 can select a specific application corresponding to the drag input DI. The icon of the specific application is displayed in the third region R3. In addition, the controller 180 can display an unconfirmed notification related to the selected specific application in the second region R2.

For example, upon reception of right drag input DI following the sliding input SI, the controller 180 can display an unconfirmed notification related to a specific application (e.g., schedule application or message application) corresponding to the drag input DI in the second region R2. In addition, the controller 180 can display an unconfirmed notification, which is related to a specific application displayed in the first region R1, in the second region R2 as the drag input DI moves to the left or right.

Figure 8:
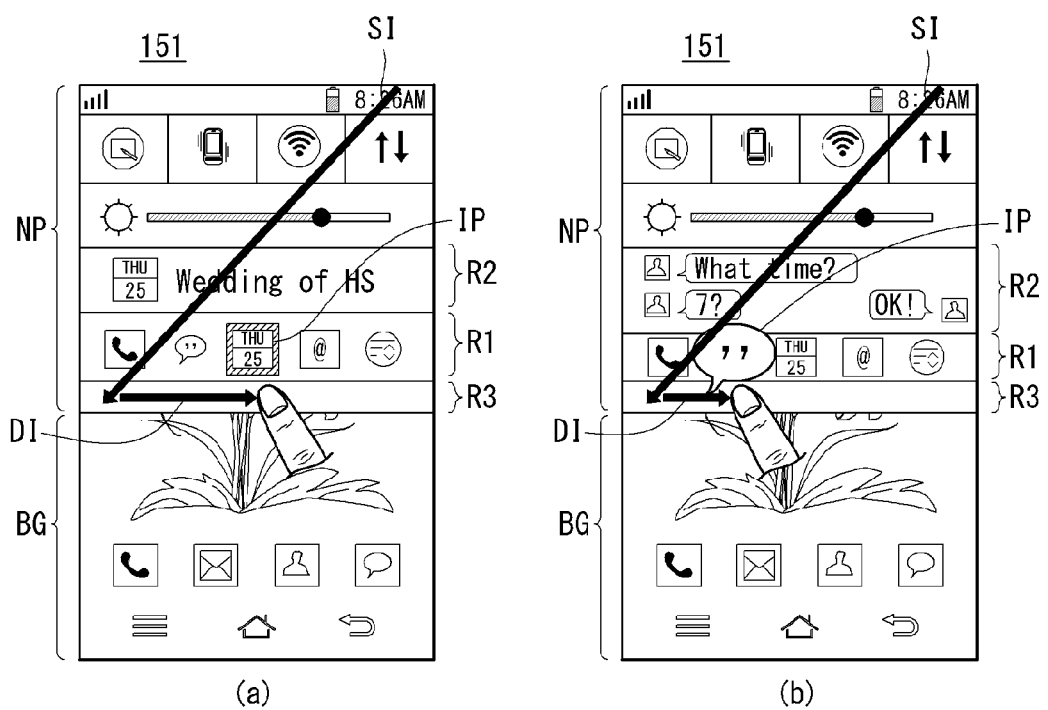

Referring to FIG. 8, the controller 180 can display the icon of the specific application selected according to the drag input DI such that the icon is discriminated from icons of other applications. The controller 180 can display an icon Ip of a specific application corresponding to a specific point at which the drain input DI is held so the icon Ip has brightness different from other icons, or magnify the icon Ip of the specific application.

Figure 9:
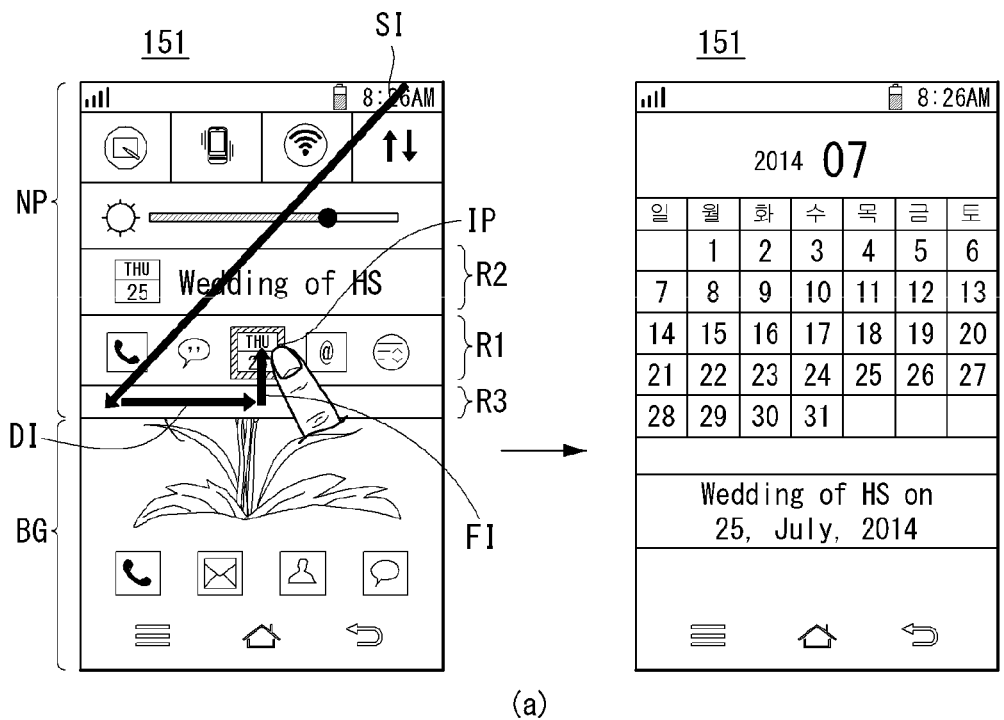
Figure 9:
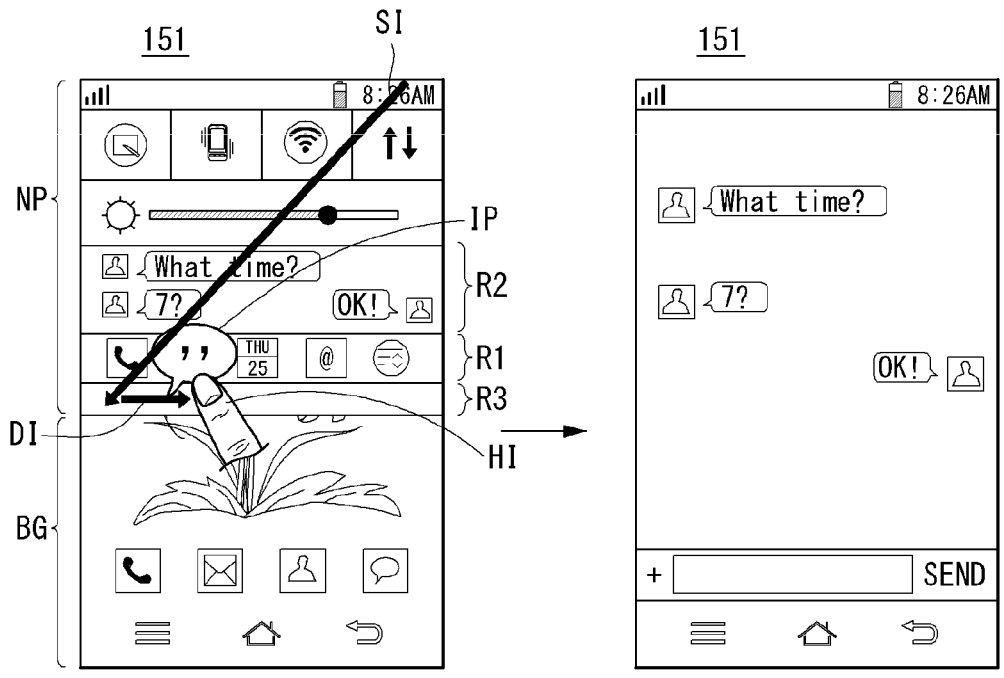

Referring to FIG. 9, upon reception of flicking input FI or hold input HI following the drag input DI, which is applied to an icon of a specific application, the controller 180 can display an execution screen of the specific application. Upon reception of the flicking input FI or hold input HI following the drag input DI, which is applied to the icon of the specific application, the controller 180 can recognize the flicking input FI or hold input HI as a control signal for executing shortcut to the specific application. Here, the execution screen of the specific application may be an execution screen on which an unconfirmed notification is displayed.

Specifically, upon reception of the flicking input FI applied to the icon of the schedule application, following the drag input DI, the controller 180 can display an execution screen of the schedule application, on which an unconfirmed notification corresponding to schedule of Thursday, July 25 is displayed. Upon reception of the hold input HI applied to the message application, following the drag input DI, the controller 180 can display an execution screen of the message application, on which unconfirmed notifications "What time?", "?" and "OK!" are displayed.

Figure 10:
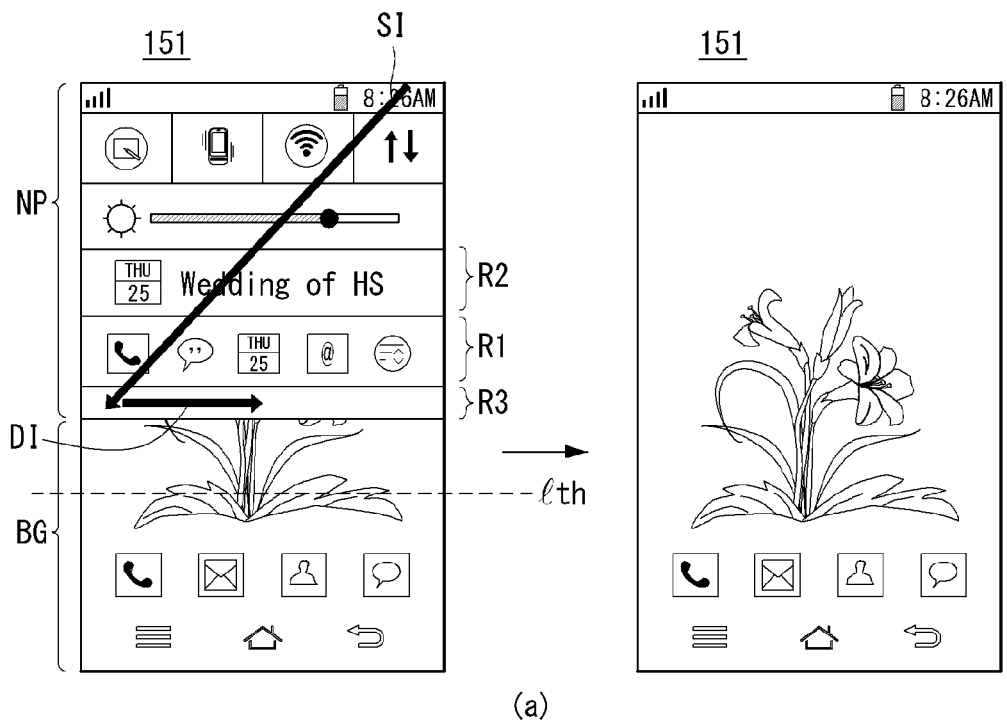
Figure 10:
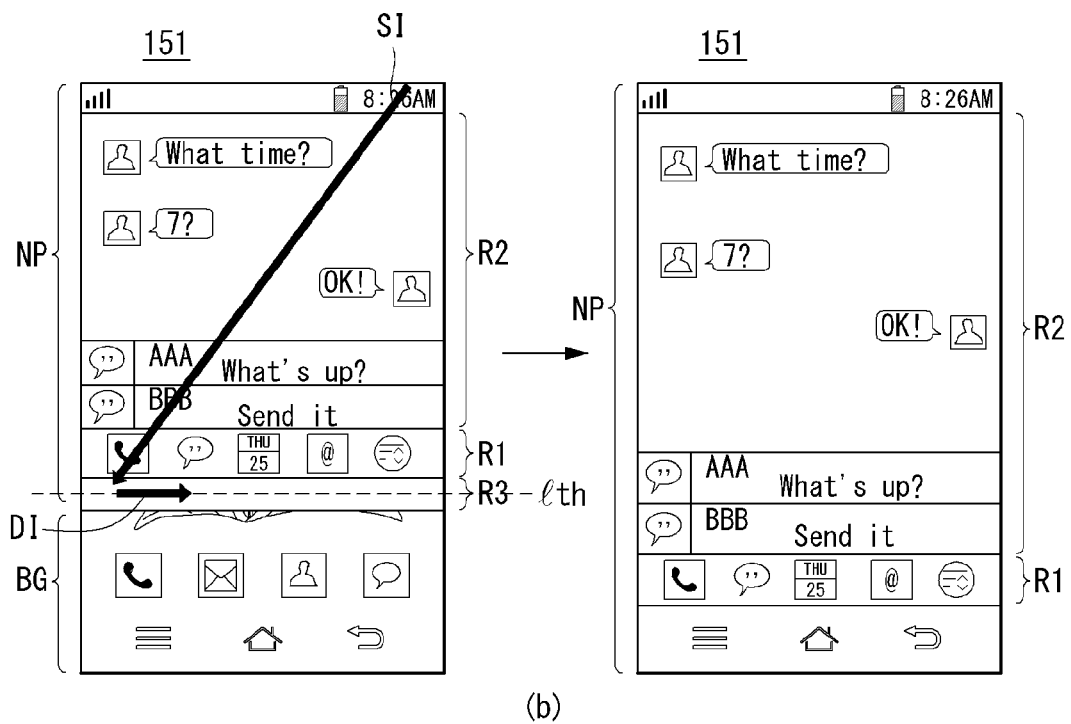

Referring to FIG. 10, upon release of the sliding input SI or drag input DI, the controller 180 can cancel display of the notification panel NP or display the notification panel NP in the overall area of the touchscreen 151 according to the trajectory of the input SI.

Upon release of the sliding input SI or drag input DI when the notification panel NP is displayed in a predetermined length "lth" or less, the controller 180 can cancel display of the notification panel (FIG. 10(a)). Upon release of the sliding input SI or drag input DI when the notification panel NP is displayed in the predetermined length "lth" or more, the controller 180 can display the notification panel NP in the overall area of the touchscreen 151 (FIG. 10(b)). When the notification panel NP is displayed in the overall area of the touchscreen 151, the controller 180 can cancel display of the third region R3 in which a sliding position of the notification panel is indicated.

Figure 11:
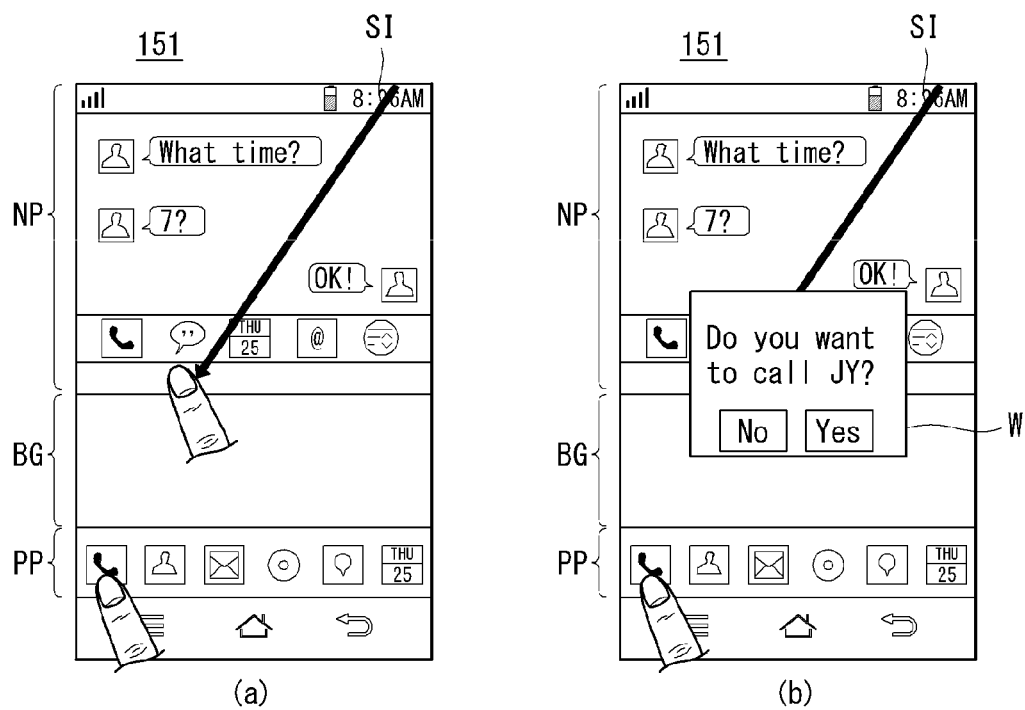

FIG. 11 illustrates a method for transmitting an unconfirmed notification displayed on the notification panel to a specific application in the mobile terminal according to an embodiment of the present invention. Referring to FIG. 11, upon reception of diagonal sliding input SI, the controller 180 can display a specific panel PP, which includes icons of a plurality of filtered applications, on the touchscreen 151 such that the specific panel PP is distinguished from the notification panel NP.

When the notification panel NP slides from one side of the touchscreen 151 to be displayed on the touchscreen 151, the controller 180 can display the specific panel PP in an area of the touchscreen 151, in which the notification panel NP is not displayed. The controller 180 can display the specific panel PP until the notification panel NP is displayed in the overall area of the touchscreen 151 and cancel display of the specific panel PP upon display of the notification panel NP in the overall area of the touchscreen.

Upon reception of touch input applied to the icon of a specific application, displayed on the specific panel PP, while the sliding input SI is maintained, the controller 180 can transmit the unconfirmed notification displayed on the notification panel NP to the specific application to which the touch input is applied.

For example, upon display of the notification panel NP in an area of the touchscreen 151 along the sliding trajectory and, simultaneously, reception of touch input applied to the icon of the call application displayed on the specific panel PP, the controller 180 can transmit sender information of an unconfirmed notification displayed on the notification panel NP to the call application to which the touch input is applied. In addition, when the sender information of the unconfirmed notification is transmitted to the call application, the controller 180 can display a function, which can be executed using the call application and the sender information, through a pop-up window W.

The controller 180 can select a specific application to be displayed on the specific panel PP based on the frequency of execution of the application, user setting or unconfirmed notification type.

Figure 12:
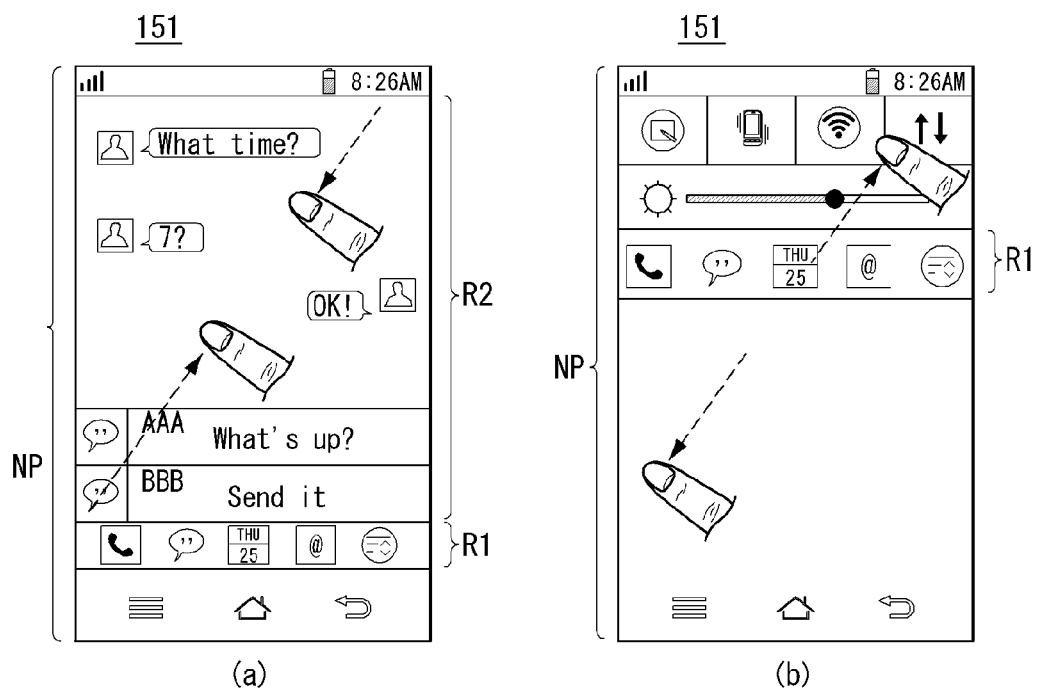
Figure 13:
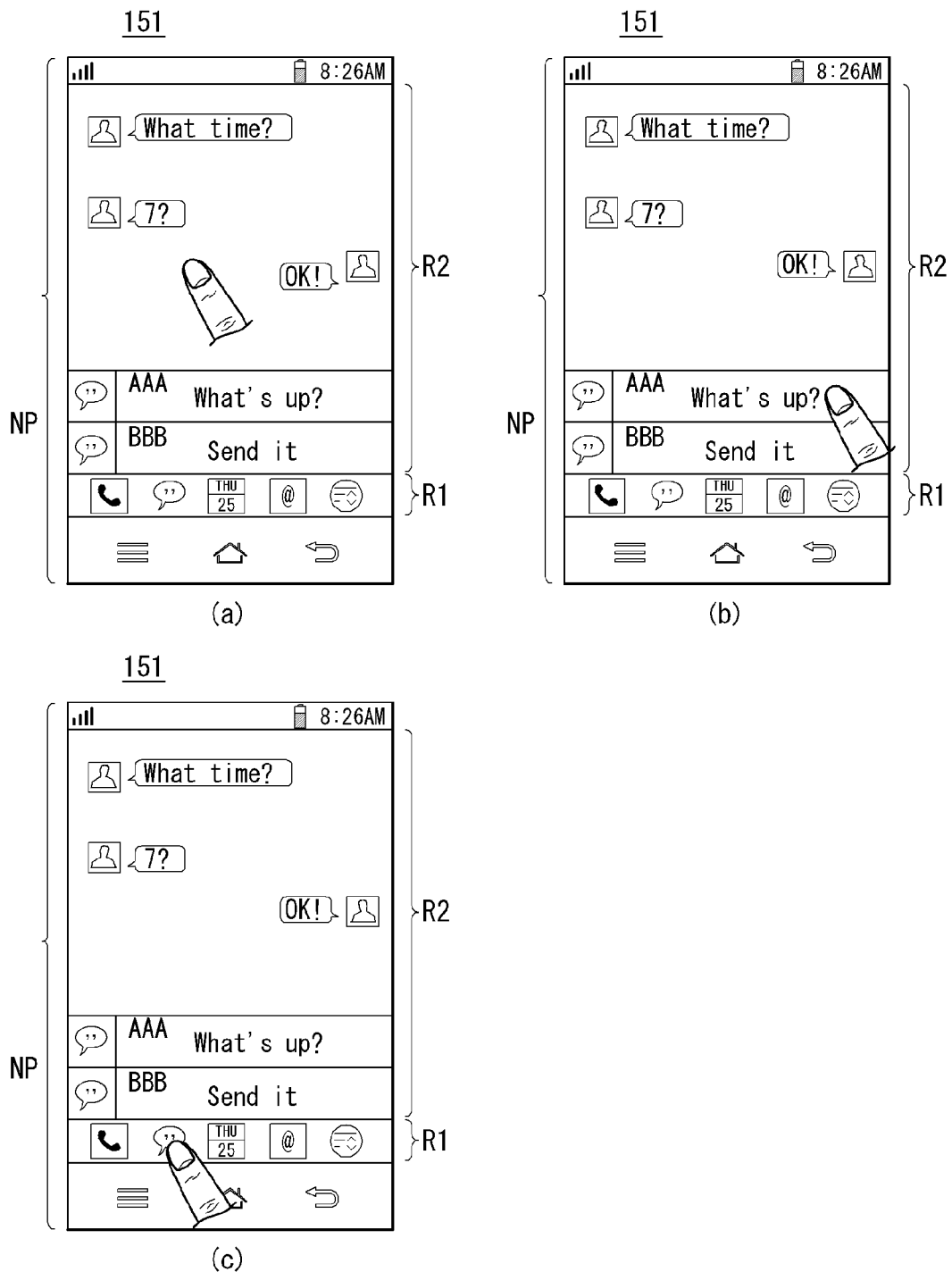

FIG. 12 illustrates a method for editing the notification panel in the mobile terminal according to an embodiment of the present invention, and FIG. 13 illustrates a method for executing a specific application related to an unconfirmed notification displayed on the notification panel in the mobile terminal according to an embodiment of the present invention.

Referring to FIG. 12, upon display of the notification panel NP in the overall area of the touchscreen 151 and reception of pinch-out input or pinch-in input applied to the notification panel NP, the controller 180 can cancel display of the second region R2 of the notification panel NP or redisplay the second region R2.

The controller 180 can cancel display of the second region R2 and display the terminal system setting item in an area corresponding to the second region, upon reception of pinch-out input applied to the notification panel NP.

Referring to FIG. 13, the controller 180 can access a specific application through touch input applied to an unconfirmed notification related to the specific application, which is displayed as a preview image or in the form of a list in the second region R2 of the notification panel NP.

The controller 180 can access a specific application through a touch input applied to the icon of the specific application, displayed in the first region R1 of the notification panel NP. Upon accessing the specific application, the controller 180 can cancel display of the notification panel NP and display an execution screen of the specific application in the overall area of the touchscreen 151.

Figure 14:
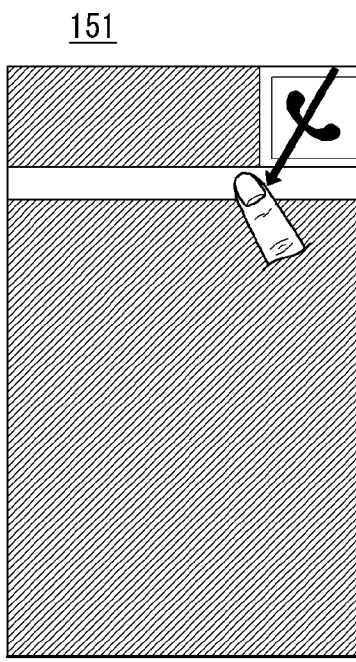
Figure 14:
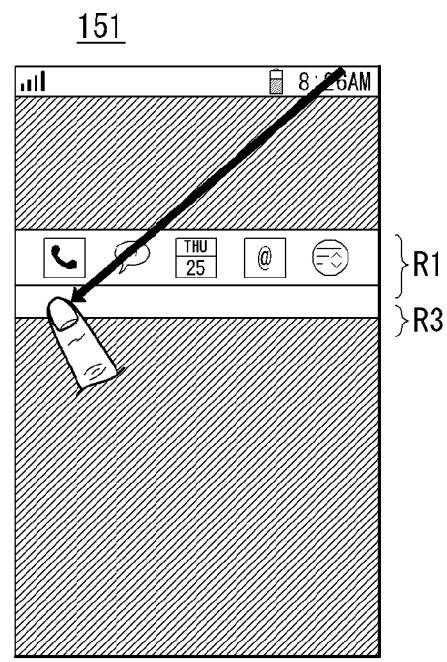
Figure 15:
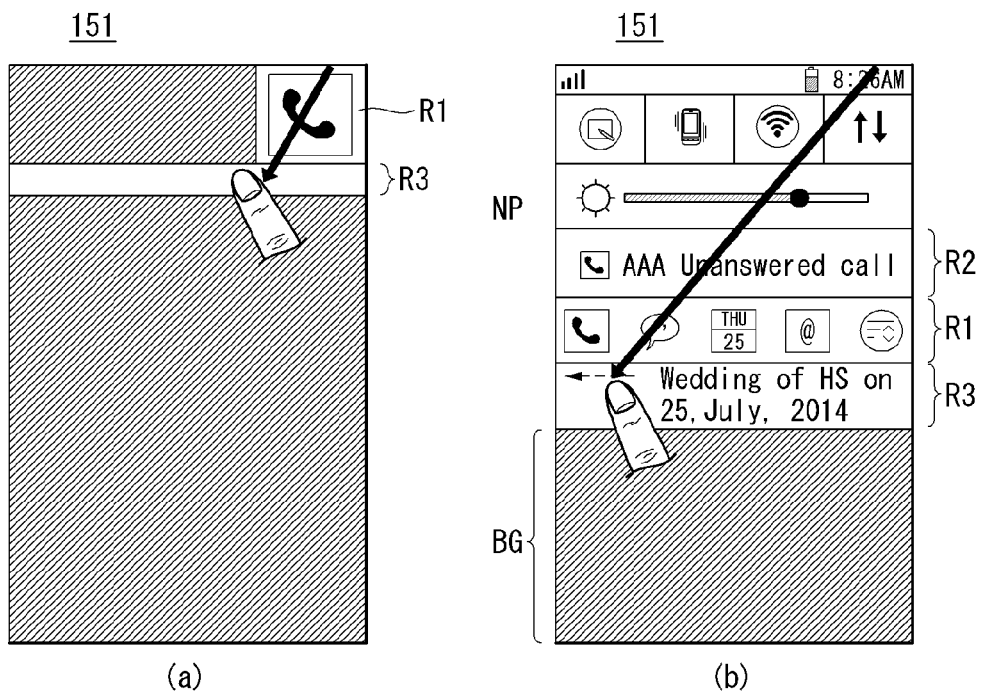
Figure 16:
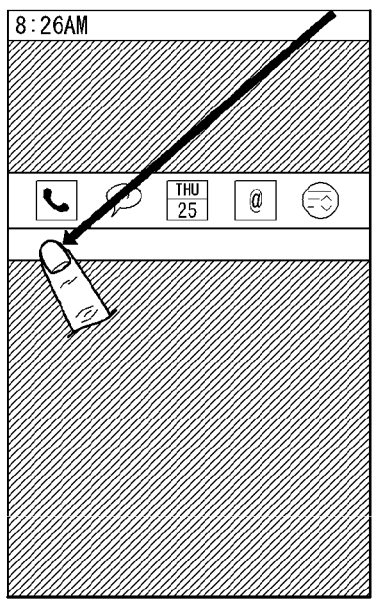
Figure 16:
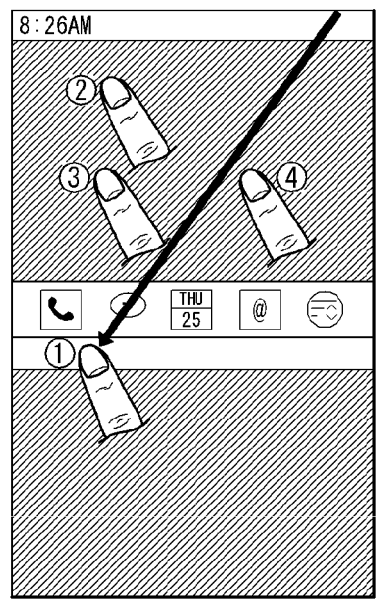
Figure 16:
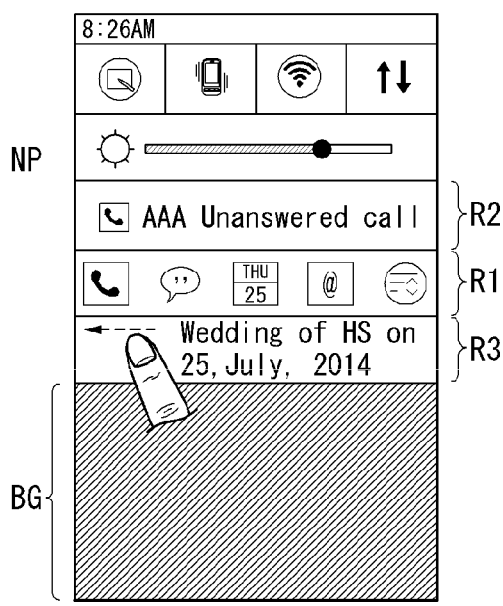

FIGS. 14 to 16 illustrate a method for displaying the notification panel when the light of the touchscreen is turned off in the mobile terminal of the present invention. Upon reception of diagonal sliding input when the light of the touchscreen 151 is turned off, the controller 180 can light up at least part of the touchscreen 151 along the sliding trajectory of the sliding input to display the notification panel NP.

Referring to FIG. 14, when the terminal is locked, the controller 180 can display the first region R1 and the third region R3 of the notification panel NP according to diagonal sliding input and maintain other regions of the notification panel NP in a light-off state. Here, the controller 180 can control the first region R1 to slide along the sliding trajectory of the sliding input to be displayed.

Referring to FIG. 15, when the terminal is not locked and diagonal sliding input is received while the light of the touchscreen is turned off, the controller 180 can extend the notification panel NP to a region corresponding to the diagonal sliding input. Here, the controller 180 can display the notification panel NP such that the first, second and third regions R1, R2 and R3 are included therein.

Referring to FIG. 16, when the terminal is locked, the controller 180 can display only the first region R1 and third region R3 of the notification panel NP according to diagonal sliding input. Upon input of an unlock pattern while only the first and third regions R1 and R3 of the notification panel NP are displayed, the controller 180 can display the remaining region of the notification panel NP.

For example, when the unlock pattern is a specific code, the controller can maintain the diagonal sliding input (①) and display the remaining region of the notification panel NP upon input of the specific code ((②) to (④)).

The controller 180 can display unconfirmed notifications in the second region R2 of the notification panel NP and display some or all unconfirmed notifications in the third region R3 in a sliding manner, upon input of the unlock pattern. The controller 180 can select a specific application displayed in the second region R2 according to left or right drag input following the sliding input and change display of the second region R2 to unconfirmed notifications corresponding to the selected specific application.

Upon release of the sliding input or drag input, the controller 180 can cancel display of the notification panel NP and turn off the light of the touchscreen. According to an embodiment of the present invention, a notification can be confirmed through one interaction and then the interaction can be cancelled when the light of the touchscreen is turned off so as to maintain the off state of the light of the touchscreen.

Figure 17:
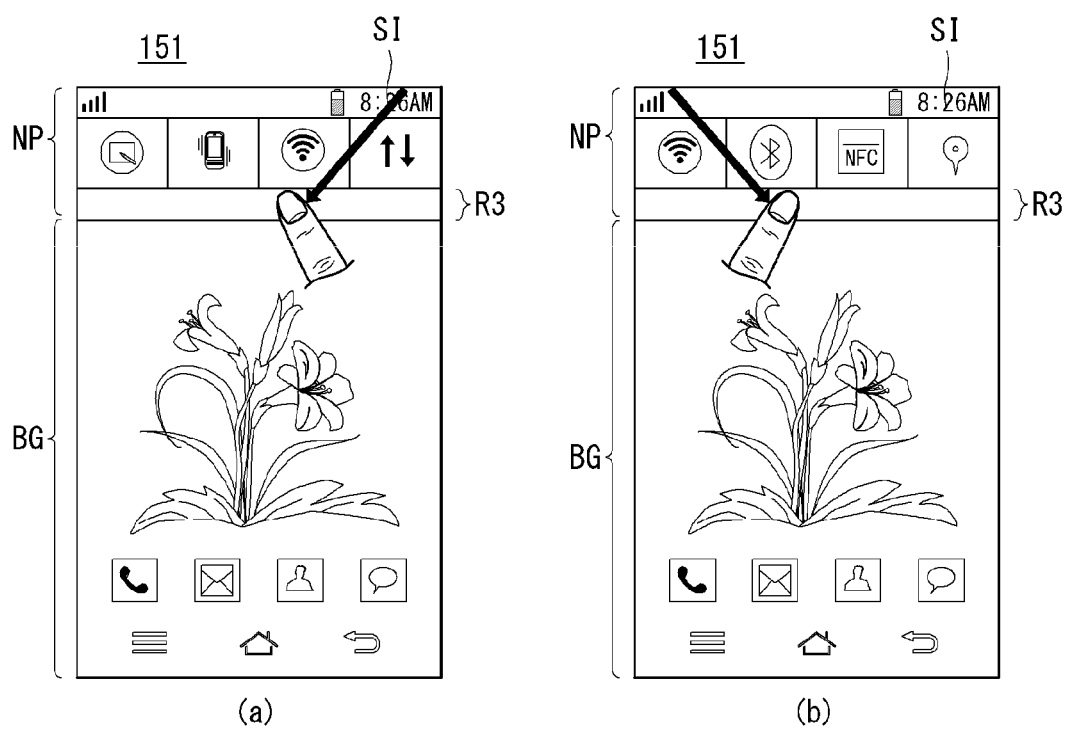
Figure 18:
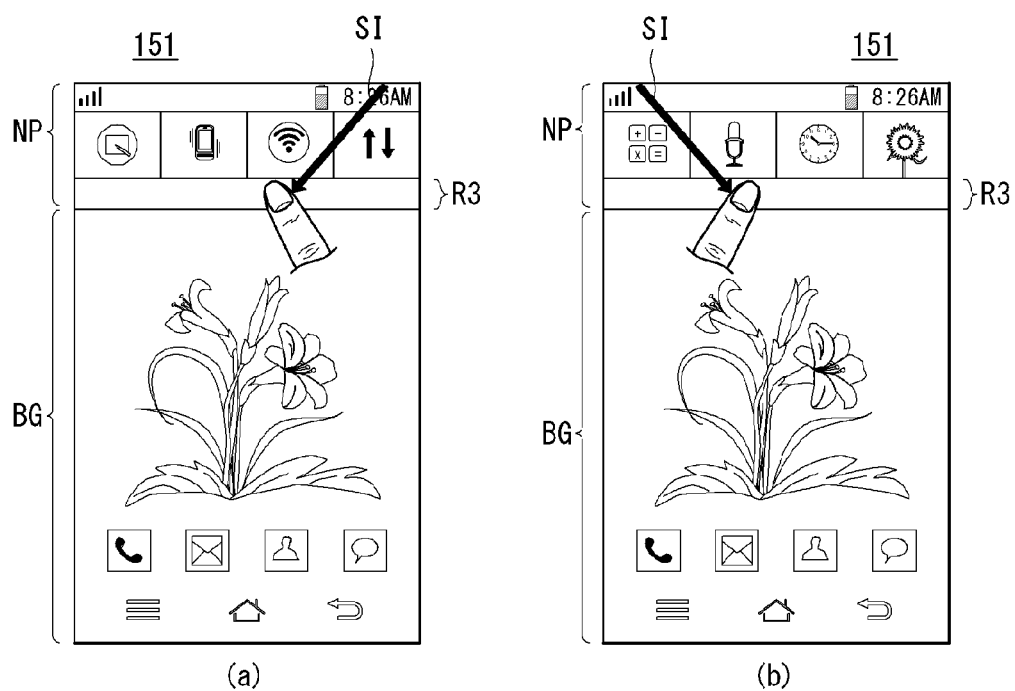

FIGS. 17 and 18 illustrate a method for displaying the notification panel based on the direction of diagonal sliding input in the mobile terminal according to an embodiment of the present invention. Referring to FIGS. 17 and 18, the controller 180 can change a display order of system setting information displayed on the notification panel NP or a display order of shortcut application icons displayed on the notification panel NP based on the direction of diagonal sliding input.

For example, upon reception of sliding input in the first diagonal direction, the controller can display the system setting information displayed on the notification panel NP in the order of memo pad setting, vibration setting, Wi-Fi setting and data setting (FIG. 17(a)). Upon reception of sliding input in the second diagonal direction, the controller can display the system setting information displayed on the notification panel NP in the order of Wi-Fi setting, Bluetooth setting, NFC setting and GPS setting (FIG. 17(b)).

Referring to FIG. 18, the controller 180 can select the system setting information or shortcut application icons, which will be displayed on the notification panel NP, based on the direction of diagonal sliding input.

For example, upon reception of sliding input in the first diagonal direction, the controller can display the system setting information on the notification panel NP (FIG. 18(a)). Upon reception of sliding input in the second diagonal direction, the controller can display the shortcut application icons on the notification panel NP (FIG. 18(b)).

The mobile terminal and the method for controlling the same according to an embodiment of the present invention have the following advantages. For example, the user convenience is improved since a user can check a desired notification message through a one-time interaction. In addition, an execution screen of a specific application related to the checked notification message can be immediately displayed or a previous screen can be displayed after display of the notification panel is ended, upon completion of the interaction, and thus operation continuity can be secured and a new operation can be easily performed.

Further, different notification panels can be configured according to interaction directions. Also, a notification can be checked according to one-time interaction even when the display unit is turned off and the power-off state of the display unit can be maintained when touch input is released.

Thus, according to an embodiment of the present invention, unconfirmed notifications can be checked per application according to one-time interaction and a previous image can be displayed upon release of the interaction, thereby easily confirming notifications through one-time interaction.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a wireless communication unit configured to provide wireless communication;
a touchscreen; and
a controller configured to:
receive a diagonal sliding input from one side of the touchscreen,
display a notification panel on the touchscreen including at least first and second regions, wherein the first region includes at least a first application icon corresponding to a first unconfirmed notification, in response to the diagonal sliding input,
receive a horizontal drag input following the diagonal sliding input, and
display details of the first unconfirmed notification in the second region in response to the horizontal drag input,
wherein a start point of the horizontal drag input is coincident with an end point of the diagonal sliding input.

2. The mobile terminal of claim 1, wherein the first region further includes a second application icon corresponding to a second unconfirmed event, and
wherein the controller is further configured to display details of the first unconfirmed event when the horizontal drag input is positioned at the first application icon, and display details of the second unconfirmed event when the horizontal drag input is positioned at the second application icon.

3. The mobile terminal of claim 2, wherein the first and second application icons are displayed in a horizontal direction on the touchscreen.

4. The mobile terminal of claim 3, wherein the controller is further configured to slide the first region in the horizontal direction based on the horizontal drag input.

5. The mobile terminal of claim 2, wherein the controller is further configured to display the first and second application icons in an order based on an unconfirmed notification reception order, a frequency of execution of an application corresponding to the first and second application icons, and a number of received unconfirmed notifications.

6. The mobile terminal of claim 2, wherein the controller is further configured to:
distinguishably display the first application icon from the second application icon when the horizontal drag input is positioned at the first application icon, and
distinguishably display the second application icon from the first application icon when the horizontal drag input is positioned at the second application icon.

7. The mobile terminal of claim 1, wherein the controller is further configured to display the details of the first unconfirmed event when the horizontal drag input is positioned and held at the first application icon or an upward or downward flicking input follows the horizontal drag input.

8. The mobile terminal of claim 1, wherein the controller is further configured to:
display a specific panel including a plurality of filtered application icons separately from the notification panel, in response to the diagonal sliding input,
receive a touch input applied to a corresponding filtered application icon included the specific panel, and
execute an application of the corresponding filtered application icon using the details of the first unconfirmed notification based on the received touch input.

9. The mobile terminal of claim 1, wherein the controller is further configured to display the details of the first unconfirmed notification in a list or as a preview screen.

10. The mobile terminal of claim 1, wherein the diagonal sliding input starts from a corner of the touchscreen or a bezel region surrounding the corner at a predetermined angle or more.

11. The mobile terminal of claim 1, wherein the controller is further configured to:
continuously magnify the second region and display the notification panel in an entire area of the touchscreen when the horizontal drag input is greater than a predetermined length and released, and
stop displaying the notification panel when the horizontal drag input is less than or equal to the predetermined length and released.

12. The mobile terminal of claim 1, wherein the controller is further configured to:
display a third region of the notification panel, the horizontal drag input being received in the third region, and
display the details of the first unconfirmed notification the third region of the notification panel in a sliding manner while receiving the horizontal drag input.

13. The mobile terminal of claim 1, wherein the controller is further configured to display at least one of a terminal system setting item and an application icon on the notification panel based on a direction of the diagonal sliding input.

14. The mobile terminal of claim 1, wherein the controller is further configured to display at least one of a terminal system setting item and an application icon on the notification panel in a display order that is changed according to a direction of the diagonal sliding input.

15. The mobile terminal of claim 1, wherein the controller is further configured to:
receive a pinch-in input or pinch-out input on the notification panel, and
adjust a size of the second region based on the received pinch-in input or pinch-out input.

16. The mobile terminal of claim 1, wherein the controller is further configured to:
deactivate a light of the touchscreen,
receive the diagonal sliding input while the light of the touchscreen is deactivated, and
activate at least part of the touchscreen along a sliding trajectory of the diagonal sliding input to display the notification panel.

17. The mobile terminal of claim 16, wherein the controller is further configured to:
lock the mobile terminal, and
display only application icons corresponding to unlocked applications related to the first unconfirmed notification.

18. The mobile terminal of claim 1, wherein the controller is further configured to:
deactivate a light of the touchscreen,
receive the diagonal sliding input while the light of the touchscreen is deactivated,
activate only the light of the touchscreen for the first region along the sliding trajectory of the sliding input, and
activate the light of the touchscreen for the second region while the sliding input is maintained and a security pattern is input through the touchscreen.

19. The mobile terminal of claim 18, wherein the controller is configured to cancel display of the notification panel and to deactivate the light of the touchscreen, upon release of the horizontal drag input.

20. A method of controlling a mobile terminal, the method comprising:
- receiving, via a controller of the mobile terminal, a diagonal sliding input from one side of a touchscreen of the mobile terminal;
- displaying a notification panel on the touchscreen including at least first and second regions, wherein the first region includes at least a first application icon corresponding to a first unconfirmed notification, in response to the diagonal sliding input;
- receiving, via the controller, a horizontal drag input following the diagonal sliding input; and
- displaying details of the first unconfirmed notification in the second region in response to the horizontal drag input,
- wherein a start point of the horizontal drag input is coincident with an end point of the diagonal sliding input.

\* \* \* \* \*